United States Patent [19]

Ono

[11] Patent Number: 4,500,115
[45] Date of Patent: Feb. 19, 1985

[54] MOUNTING ARRANGEMENT FOR THROUGH ANCHOR

[75] Inventor: Katsuyasu Ono, Kanagawa, Japan

[73] Assignee: NSK-Warner K.K., Japan

[21] Appl. No.: 444,503

[22] Filed: Nov. 24, 1982

[30] Foreign Application Priority Data

Nov. 24, 1981 [JP] Japan .................... 56-174382[U]

[51] Int. Cl.³ .................................. B60R 21/10
[52] U.S. Cl. ........................... 280/808; 297/483
[58] Field of Search ............... 280/801, 804, 808, 807; 297/468, 473, 483, 486

[56] References Cited

U.S. PATENT DOCUMENTS 4,135,737  1/1979  Scholz et al. .................. 280/808
4,225,185  9/1980  Krzok .......................... 280/801
4,398,751  8/1983  Wahlmann et al. ............... 280/808

FOREIGN PATENT DOCUMENTS 2303222  8/1974  Fed. Rep. of Germany ...... 297/483
2081568  2/1982  United Kingdom ............... 280/808

Primary Examiner—Richard A. Bertsch
Assistant Examiner—Kenneth R. Rice
Attorney, Agent, or Firm—Cantor and Lessler

[57] ABSTRACT

A mounting arrangement for a through anchor for passing an automobile seat belt webbing through characterized in that an adjustable anchor provided with a freely-rotating through anchor is adapted to slide up and down on an adjusting base, freely-rotating adjustable anchor latch pieces provided with fastening legs and biased by a return spring are fixed on the adjustable anchor, and the fastening legs are fastened with fastening means provided on the adjusting base so as to hold the adjustable anchor at a set position.

11 Claims, 10 Drawing Figures

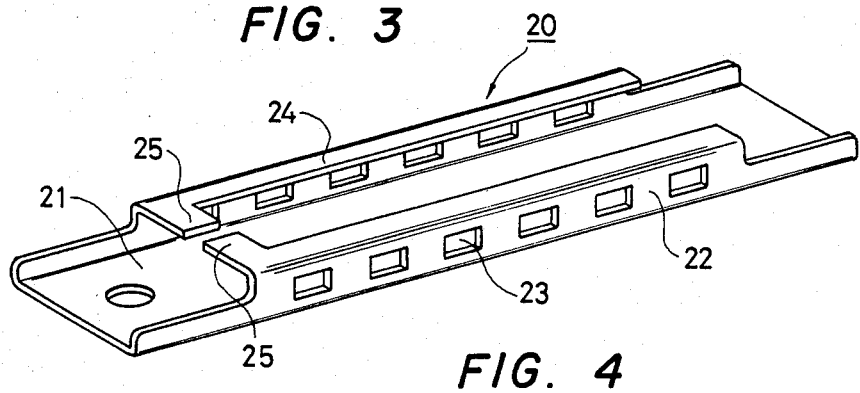
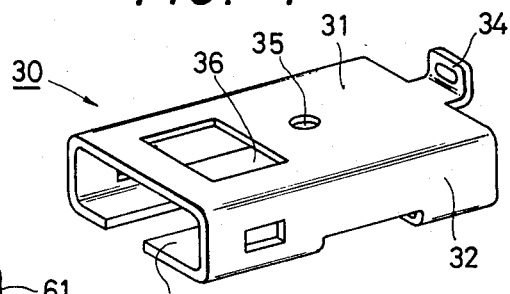
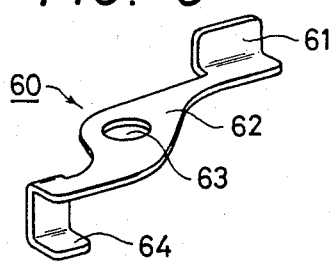
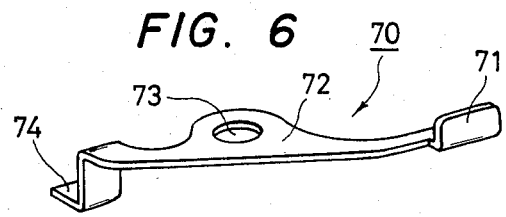
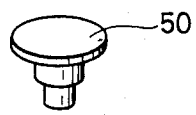

MOUNTING ARRANGEMENT FOR THROUGH ANCHOR

BACKGROUND OF THE INVENTION

The present invention relates to a mounting arrangement for an automobile seat belt.

Nowadays, as automotive vehicles run at a speed higher than ever, safety protection for an occupant in the vehicle in an emergency as a collision or sudden braking strongly requires the occupant to wear a seat belt. Particularly, in order to prevent occupants in front seats from a secondary collision against structures in the vehicle, a three-point type seat belt has commonly been used for simultaneously restraining the upper body and waist of the occupant in the vehicle.

But because occupants wearing the seat belts may vary in body size, if the position of the anchoring device for a shoulder webbing restraining the upper body is too high, the webbing will pass over the wearer's face or neck, and if the position is too low, it will slip off from the wearer's shoulder and pass over his arms. Consequently in both of these cases, the seat belt tends to be incapable of giving effective protection to the occupant at emergency.

In addition to the above, two U.S. patents are noted as prior art, namely, U.S. Pat. No. 4,135,737 and 4,225,185, but neither of them has any suggestion of a mounting arrangement for a through anchor which is provided with a pair of adjustable anchor latch pieces biased by a return spring.

SUMMARY OF THE INVENTION

The present invention intends to eliminate said defect, wherein an adjusting anchor provided with a through anchor and adapted to slide up and down on an adjusting base fixed to the car body is fastened at a fixed position on the adjusting base by adjustable anchor latch pieces biased by a return spring so that the through anchor may be set to its best position for adjusting the webbing position in accordance with the body size of the occupant in the vehicle.

BRIEF DESCRIPTION OF THE DRAWINGS

The invention will be better understood from the following description taken in connection with the accompanying drawings in which:

FIG. 3 is a perspective view of the adjusting base;

FIG. 4 is a perspective view of the adjustable anchor;

FIG. 5 and FIG. 6 are perspective views of the respective adjustable anchor latch pieces on both sides;

FIG. 7 is a schematic view of the pin;

FIG. 8 is a schematic view of the nylon washer;

FIG. 9 is a schematic view of the return spring; and

DETAILED DESCRIPTION OF PREFERRED EMBODIMENTS

Figure 1:
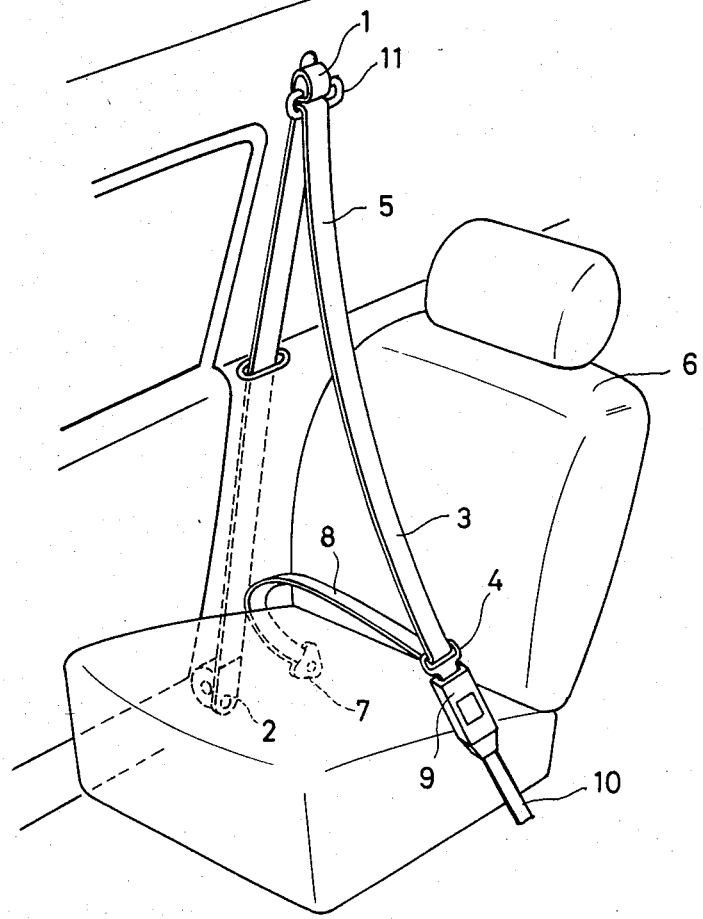
FIG. 1 is a schematic view of an automobile seat belt arrangement.

Turning now descriptively to the schematic and perspective views, FIG. 1 shows a schematic view of an automobile seat belt arrangement, wherein an anchor arrangement to which the through-anchor device is applied is fixed to the car body, and a continuous webbing 3, drawn out of a winding device 2 and changing into a shoulder webbing 5 through a through anchor 11 fixed to an anchor device 1 and further into a waist webbing 8 through a tongue 4, is fastened at an anchor 7. The tongue 4 is fixed into a buckle device 9 attached to a flexible supporter 10 mounted on the car body floor The reference numeral 6 shows a seat.

In a conventional arrangement, because of the fixed position of the through anchor 11, the shoulder webbing 5 often passes inconveniently near the face or arms of an occupant in the vehicle depending on his body size. In the present invention, therefore, the position of the through anchor is made adjustable.

Figure 2:
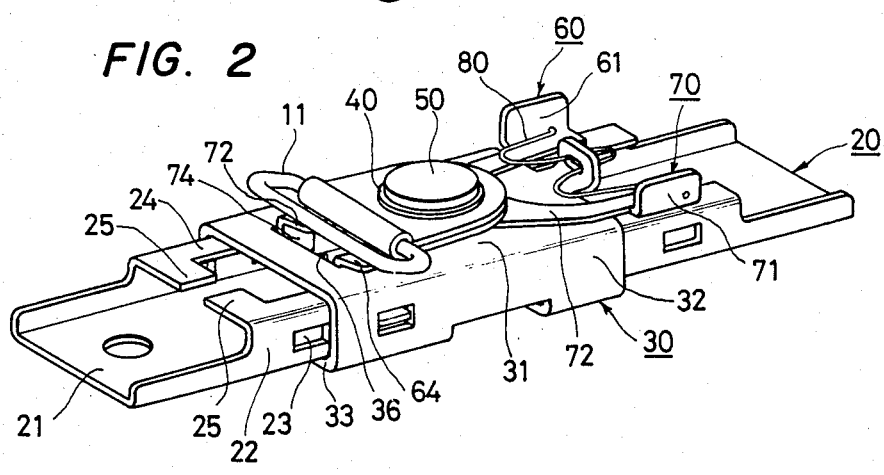
FIG. 2 is a schematic view of the mounting arrangement for a through anchor according to the present invention.

FIG. 2 shows a schamatic view of the mounting arrangement for the through anchor in the present invention, wherein the mounting arrangement comprises an adjustable base 20 fixed to the car body, an adjustable anchor 30 which can slide up and down on the adjusting base 20, and adjustable anchor latch pieces 60, 70 for fastening the adjustable anchor 30 to the adjustable base 20. The through anchor 11 being mounted on the adjustable anchor 30 in a manner to rotate freely by means of a pin 50.

Referring now to FIG. 2 to FIG. 6, the adjusting base 20 is fixed to the car body through its base plate 21. Side plates 22 define openings 23 as the interlocking means at predetermined intervals. Side plates 22 are bent inward to form upper plates 24 and a fastening projection 25 is provided at the lower end of the upper plate 24. The adjustable anchor 30, which is to be assembled together with the adjusting base 20, comprises an upper plate 31, side plates 32 and lower plates 33, and is assembled astride the adjusting base 20 as shown in FIG. 2. The adjustable latch piece 60 comprises a fingering piece 61, a lever plate 62, a pin hole 63 formed substantially at the center of gravity and an engaging leg 64. The other adjustable latch piece 70 also comprises a fingering piece 71, a lever plate 72, a pin hole 73 formed substantially at the center of gravity and an engaging leg 74. As shown in FIG. 2, the through anchor 11 and adjustable latch pieces 60, 70 are fixed on the upper plate 31 of the adjustable anchor 30 in a manner to rotate freely by means of the pin 50 with a nylon washer 40. The pin 50 extends through a hole formed at the mounting position of the through anchor 11, a hole 41 on the nylon washer 40 (FIG. 8), holes 63, 73 on the adjustable anchor latch pieces 60,70, and a hole 35 formed on the upper plate 31 of the adjustable anchor 30 and is clinched. The adjustable anchor latch pieces 60,70 are mounted intersecting each other, the fastening legs 64, 74 extending downward through a hole 36 formed on the upper plate 31 of the adjustable anchor 30 so that their ends may respectively turn outward (FIG. 2). The adjustable anchor latch pieces 60, 70 are biased outwardly by a return spring 80 set between the fingering pieces 61, 71. (The springs shown in FIG. 2 and FIG. 9 are w-shaped but they may also be coiled springs.) Thus the engaging legs 64, 74 at the ends of the latch pieces 60, 70 are also biased outwardly so that they may enter the openings formed on the side plate 22 of the adjusting base 20 and the adjustable anchor 31 is fastened at the right position. FIG. 7 and FIG. 8 show the pin 50 and the nylon washer 40 respectively.

When the set position of the through anchor is to be changed, the fingering pieces 61, 71 are pushed inward at both sides to press the return spring 80 hung on a hanging piece 34 for the return spring 80 provided between the fingering pieces 61, 71 so as to make the space between the adjustable anchor latch pieces 60 and 70 narrower. Thus the engaging legs 64, 74 are disengaged from the openings 23, and the adjustable anchor 30 and through anchor 11 can slide up and down on the adjusting base 20. If the fingers leave the fingering pieces 61, 71 when the fastening legs 64, 74 get close to the proper openings 23, the return spring 80 pushes the adjustable anchor latch pieces 60, 70 to open outward again, and the engaging legs 64, 74 enter the openings 23. Thus the adjustable anchor 30 or the through anchor 11 is fastened at the adequate position.

Figure 10:
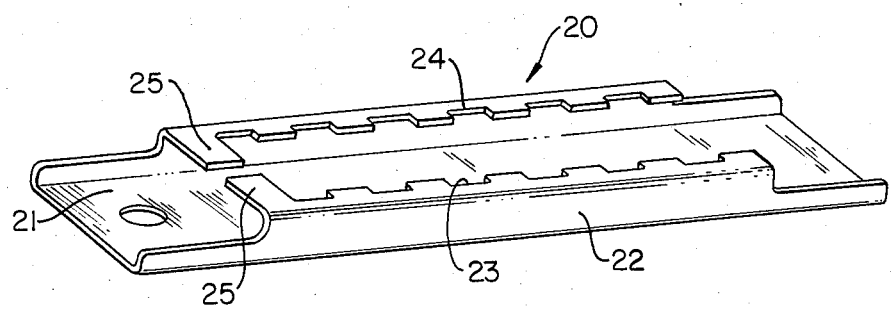
FIG. 10 is a perspective view of another embodiment of the adjusting base.

In the above structure, the latch pieces 60, 70 are respectively supported substantially at the centers of their gravities and no rotating moment is thus produced even when applied with an impact force, thereby avoiding any accidental release of the engagement legs 64, 74 from their matching openings 23 of the adjustable anchor. Referring to FIG. 10, there will be seen an alternate embodiment of the adjusting base 20 wherein the plurality of interlocking means 123 are formed on the top plate 24.

While only preferred embodiments of the invention have been illustrated and described in detail, it is understood that the invention is not limited to the above examples, but is susceptible of numerous modifications such as forming projections as the interlocking means instead of openings, or forming the interlocking means on the adjusting base side plate and upper plate respectively. Such modifications greatly contribute to the steady fastening of the adjustable anchor.

Thus the invention makes it possible to adjust the position of the through anchor in accordance with the body size of an occupant in the vehicle and enables the occupant to wear the webbing correctly on his shoulder thereby affording the occupant perfect protection against injuries.

What is claimed is:

1. A device adapted to mount, on an automobile body, a through-anchor which permits the webbing of an automobile seat belt to extend therethrough, said device comprising:
   an adjustable anchor carrying the through-anchor fixedly secured thereon;
   a base to be fixedly mounted on the automobile body and equipped with a plurality of interlocking means which are arranged in pairs along two mutually-parallel lines with a predetermined interval between each two adjacent interlocking means on each of the lines;
   a pair of latch pieces provided with the adjustable anchor in such a way that the latch pieces are displaceable between engagement positions where the latch pieces are engaged with the interlocking means in any of the pairs and non-engagement positions where the latch pieces are not engaged with any of the interlocking means; and
   biasing means adapted to bias the latch pieces toward the engagement position.

2. A device as claimed in claim 1, wherein each of the latch pieces defines at one end thereof an engagement portion which is engageable with any one of the interlocking means on its corresponding line.

3. A device as claimed in claim 2, wherein the other end of the latch piece is formed into a manipulating portion operable by a finger.

4. A device as claimed in claim 3, wherein the ltch pieces are shifted from the engagement position to the non-engagement position when their respective manipulating portions are operated in directions decreasing the distance therebetween.

5. A device as claimed in claim 3, wherein the manipulating portions of the latch pieces are operated in directions substantially perpendicular to the displacement directions of the adjustable anchor.

6. A device as claimed in claim 1, wherein the latch pieces are turnably attached to the adjustable anchor, substantially, at their respective centers of gravity.

7. A device as claimed in claim 6, wherein the latch pieces are attached to the adjustable anchor in such a way that they intersect substantially at their respective centers of gravity.

8. A device as claimed in claim 1, wherein the base comprises a bottom plate, side plates and top plate.

9. A device as claimed in claim 8, wherein the plurality of interlocking means are openings formed through the side plates.

10. A device as claimed in claim 8, wherein the plurality of interlocking means are formed at the top plate.

11. A device adapted to mount a through-anchor which permits the webbing of an automobile seat belt to extend therethrough, said device comprising:
    a base including side plates which respectively define openings with a predetermined interval;
    an adjustable anchor provided slidably up and down on the base and carrying the through-anchor secured rotatably thereon by means of a pin; and
    a pair of latch pieces each having an engagement portion at one end thereof and biased outwardly at their respective engagement portions by means of a return spring and turnably provided on the adjustable anchor by means of the pin, thereby allowing the insertion of the engagement portions of the latch pieces into a desired pair of the openings so as to lock the adjustable anchor at a desired position.

* * * * *